(12) United States Patent
O'Donnell

(10) Patent No.: US 7,782,285 B2
(45) Date of Patent: Aug. 24, 2010

(54) DRIVE CIRCUIT FOR LIQUID CRYSTAL DISPLAYS AND METHOD THEREFOR

(75) Inventor: Eugene Murphy O'Donnell, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 23 days.

(21) Appl. No.: 10/433,165

(22) PCT Filed: Nov. 29, 2001

(86) PCT No.: PCT/US01/44841

§ 371 (c)(1),
(2), (4) Date: May 30, 2003

(87) PCT Pub. No.: WO02/45066

PCT Pub. Date: Jun. 6, 2002

(65) Prior Publication Data

US 2004/0036665 A1     Feb. 26, 2004

(51) Int. Cl.
   *G09G 3/36*     (2006.01)
(52) U.S. Cl. .......................................... 345/90; 345/92
(58) Field of Classification Search ........... 345/87–100, 345/204
See application file for complete search history.

(56) References Cited

U.S. PATENT DOCUMENTS

| | | | | |
|---|---|---|---|---|
| 4,651,149 A | * | 3/1987 | Takeda et al. ................. | 345/90 |
| 5,168,270 A | * | 12/1992 | Masumori et al. ........... | 345/100 |
| 5,627,557 A | * | 5/1997 | Yamaguchi et al. .......... | 345/90 |
| 5,666,130 A | * | 9/1997 | Williams et al. .............. | 345/90 |
| 5,764,210 A | * | 6/1998 | Moon .......................... | 345/90 |
| 5,790,213 A | * | 8/1998 | Sasaki et al. .................. | 349/48 |
| 5,945,972 A | * | 8/1999 | Okumura et al. .............. | 345/98 |
| 6,064,362 A | | 5/2000 | Brownlow et al. | |
| 6,078,303 A | * | 6/2000 | McKnight ..................... | 345/87 |
| 6,329,971 B2 | * | 12/2001 | McKnight ..................... | 345/95 |
| 6,331,844 B1 | | 12/2001 | Okumura et al. | |
| 6,480,178 B1 | * | 11/2002 | Itakura et al. ................. | 345/89 |
| 2003/0001811 A1 | * | 1/2003 | O'Donnell .................... | 345/90 |
| 2004/0027321 A1 | * | 2/2004 | O'Donnell .................... | 345/87 |

FOREIGN PATENT DOCUMENTS

| | | |
|---|---|---|
| EP | 0586155 | 3/1994 |
| EP | 0807918 | 11/1997 |
| JP | 09-329806 | 12/1997 |
| JP | 10-062817 | 3/1998 |

\* cited by examiner

*Primary Examiner*—Regina Liang
(74) *Attorney, Agent, or Firm*—Robert D. Shedd; Harvey D. Fried; Shabtay S. Fenig

(57) ABSTRACT

In a display unit having an array of liquid crystal cells and a corresponding array of display driver circuits for each of the liquid crystal cells, each display driver circuit in the corresponding array includes an analog memory element and a differential amplifier coupled between the analog memory element and the liquid crystal cell. The differential amplifier provides isolation between the analog memory element and the liquid crystal cell.

5 Claims, 4 Drawing Sheets

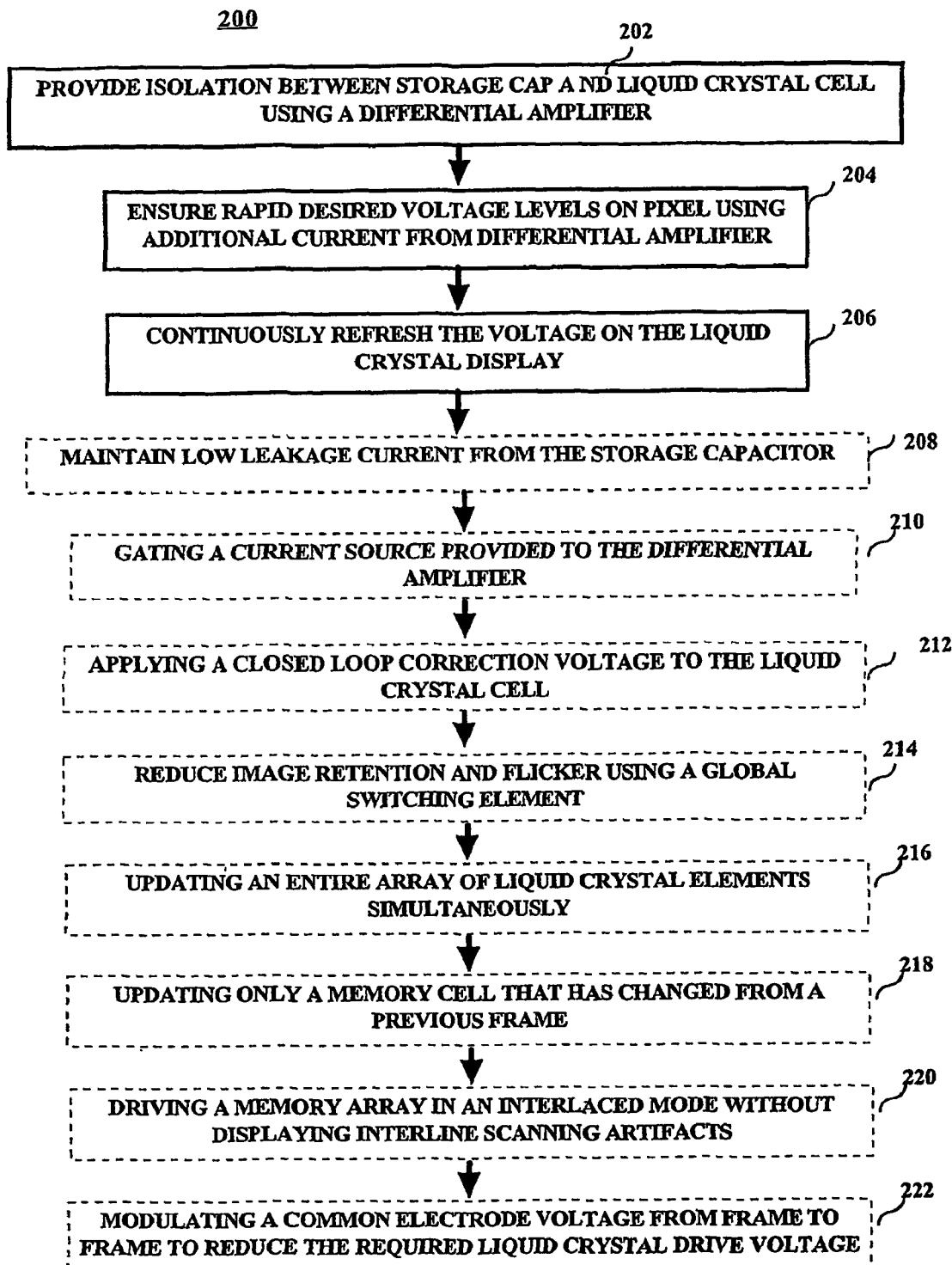

DRIVE CIRCUIT FOR LIQUID CRYSTAL DISPLAYS AND METHOD THEREFOR

This application claims the benefit under 35 U.S.C. §365 of International Application PCT/US01/44841 filed Nov. 29, 2001, which claims the benefit of U.S. Provisional Application No. 60/250,259 filed Nov. 30, 2000.

BACKGROUND OF THE INVENTION

1. Field of the Invention

This invention relates to the field of video systems utilizing a liquid crystal display (LCD) or liquid crystal on silicon (LCOS), and in particular, to a driver circuit for such displays.

2. Description of Related Art

Liquid crystal on silicon (LCOS) can be thought of as one large liquid crystal formed on a silicon wafer. The silicon wafer is divided into an incremental array of tiny plate electrodes. A tiny incremental region of the liquid crystal is influenced by the electric field generated by each tiny plate and the common plate. Each such tiny plate and corresponding liquid crystal region are together referred to as a cell of the imager. Each cell corresponds to an individually controllable pixel. A common plate electrode is disposed on the other side of the liquid crystal. The drive voltages are supplied to plate electrodes on each side of the LCOS array. Each cell, or pixel, remains lighted with the same intensity until the input signal is changed, thus acting as a sample and hold (so long as the voltage is maintained, the pixel brightness does not decay). Each set of common and variable plate electrodes forms an imager. One imager is typically provided for each color, in this case, one imager each for red, green and blue.

It is typical to drive the imager of an LCOS display with a frame-doubled signal to avoid 30 Hz flicker, by sending first a normal frame in which the voltage at the electrodes associated with each cell is positive with respect to the voltage at the common electrode (positive picture) and then an inverted frame in which the voltage at the electrodes associated with each cell is negative with respect to the voltage at the common electrode (negative picture) in response to a given input picture. The generation of positive and negative pictures ensures that each pixel will be written with a positive electric field followed by a negative electric field. The resulting drive field has a zero DC component, which is necessary to avoid image sticking, and ultimately, permanent degradation of the imager. It has been determined that the human eye responds to the average value of the brightness of the pixels produced by these positive and negative pictures so long as the frame rate is above 120 Hertz.

The present state of the art in LCOS requires the adjustment of the common-mode electrode voltage, denoted VITO, to be precisely between the positive and negative field drive for the LCOS. The subscript ITO refers to the material indium tin oxide. The average balance is necessary in order to minimize flicker, as well as to prevent a phenomenon known as image sticking.

In the current art, the LCOS drive cell looks much like a conventional Active Matrix LCD driver. This does not work well, due to the various artifacts discussed in the literature. The main causes are parasitic capacitance cross-talk, residual voltage in the LC cell, and voltage droop of the LC, due to ionic leakage and bulk resistivity of the LC material. Mainly this has been solved by 1. Increasing the cell capacitance (limited by physical area), 2. Changing to higher resistivity LC materials (limits flexibility and response time), 3. Increasing the frame scan rate to more than 60 Hz (expensive, and costs more bandwidth), and 4. Strongly controlling the temperature of the device, to maintain high voltage holding ratio (VHR).

The main cause for all of the above issues is that the available charge is only transferred to the LC cell once per frame. In a display with a million pixels, this limits the available power and doesn't allow for any closed-loop check that the desired voltage has actually been achieved on the pixel electrode. Thus, a need exists for a display driver that provides adequate isolation between a storage capacitor and a liquid crystal cell and ensures that the desired voltage is achieved on the pixel electrode.

BRIEF SUMMARY OF THE INVENTION

In a first aspect of the present invention, a display driver circuit for a liquid crystal cell in an array of liquid crystal cells comprises a storage capacitance and an amplifier coupled between the capacitance and the liquid crystal cell.

In a second aspect of the present invention, a method for driving a display, comprising the steps of providing isolation between a storage capacitor and a liquid crystal cell using a differential amplifier, ensuring rapid desired voltage levels on a pixel using additional current provided by the differential amplifier and the step of continuously refreshing the voltage on the liquid crystal cell.

In a third aspect of the present invention, a display driver for a display unit which includes a plurality of display elements arranged in a matrix of rows and columns and a memory element and a liquid crystal cell. The display unit preferably comprises a driver for switchably outputting one of a plurality of voltages to the display elements on at least one of the matrix of rows and columns, the driver including a decoder and a plurality of analog switches, each analog switch being formed from a semiconductor switch and controlled to be opened or closed by an output signal of the decoder. The display driver also comprises a storage capacitor coupled between the decoder and the semiconductor switch and a differential amplifier coupled between the storage capacitor and the liquid crystal cell, whereby the differential amplifier provides isolation between the storage capacitor and the liquid crystal cell.

BRIEF DESCRIPTION OF THE DRAWINGS

FIG. 4 is a flow chart illustrating a method of driving a display in accordance with the present invention.

DETAILED DESCRIPTION OF THE PREFERRED EMBODIMENTS

Figure 1:
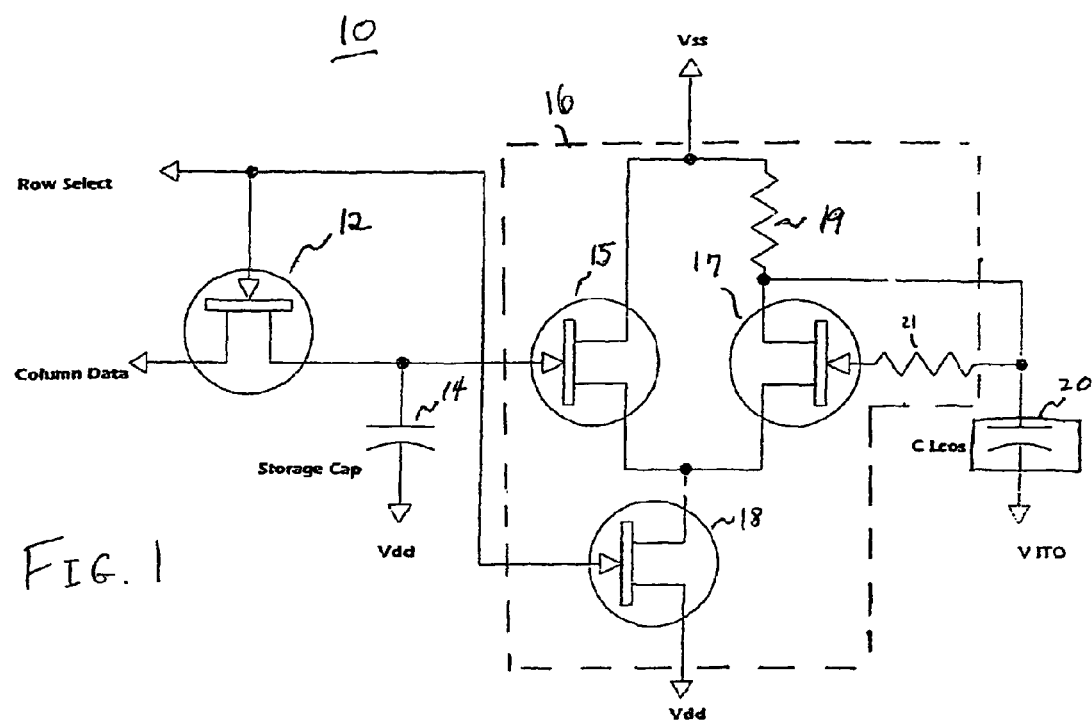
FIG. 1 is a block diagram of a liquid crystal cell driver in accordance with the present invention.

In order to overcome the problems described above, it is proposed to add an amplifier such as a differential amplifier 16 between the internal storage capacitor (14), and the LC cell (20) as shown in FIG. 1. In other words, a drive amplifier is added to the driving cell. This adds isolation between the storage capacitor and the LC cell. The added current drive capability ensures that the voltage on the pixel will rapidly become that desired and remain there. It also allows for very low leakage current from the storage capacitor (FET has very high input impedance), and allows for a continuous refresh of the voltage on the LC cell, which eliminates the 'droop' problem, as well as the residual voltaic potential stored in the cell. This should improve both the flicker issue, as well as the 'image sticking' problem which is associated with inability to achieve DC balance in the cell. It should also allow the cell to work well even at somewhat elevated temperatures.

The disadvantage of this technique is that it increases the DC current through the liquid crystal cell. This disadvantage can optionally be overcome in part by gating the current source in the bottom of the differential amplifier. This can use the 'pixel select' or "row select" bit in the device. In this way, a periodic refresh of the voltage can be achieved, while reducing the power consumption by 1/nrow, where nrow is the number of rows in the device. Since heating is uniform, this gating in some situations may not be needed.

A typical implementation in CMOS is shown in FIG. 1. The components are schematic representations, and alternate configurations can be used without loss of generality. The key points are the amplifier 16, which applies a closed loop correction voltage to the LC cell, and the optionally gated current source which allows reduction of power consumption.

Typically this circuit could be implemented with 3 transistors, which can be plac d under the liquid crystal cell in an LCOS display device. In the arrangement of FIG. 1, an amplifier 16 decouples the LC cell from the memory element (the storage capacitor 14). FIG. 1 illustrates a liquid crystal cell driver 10 for a liquid crystal display. The liquid crystal cell driver preferably comprises a plurality of transistors (12, 15, 17, and 18), a storage capacitance such as the storage capacitor 14, and a plurality of resistors 19 and 21 and the liquid crystal cell represented by liquid crystal capacitance 20. Preferably, three (3) transistors, such as transistors 15, 17 and 18 form the amplifier 16, preferably in the form of a differential amplifier. The differential amplifier 16 is preferably comprised of N-Channel transistors having respective sources coupled and the drain of transistor 17 serving as an output to the liquid crystal cell (20). Additionally, the respective sources of the differential amplifier 16 are coupled and driven by a current source which is another N-Channel transistor such as transistor 18 that sets the balance current in the differential amplifier. The differential amplifier 16 is coupled between the storage capacitor 14 and provides isolation between the storage capacitor 14 and a liquid crystal cell 20 or pixel.

Figure 2:
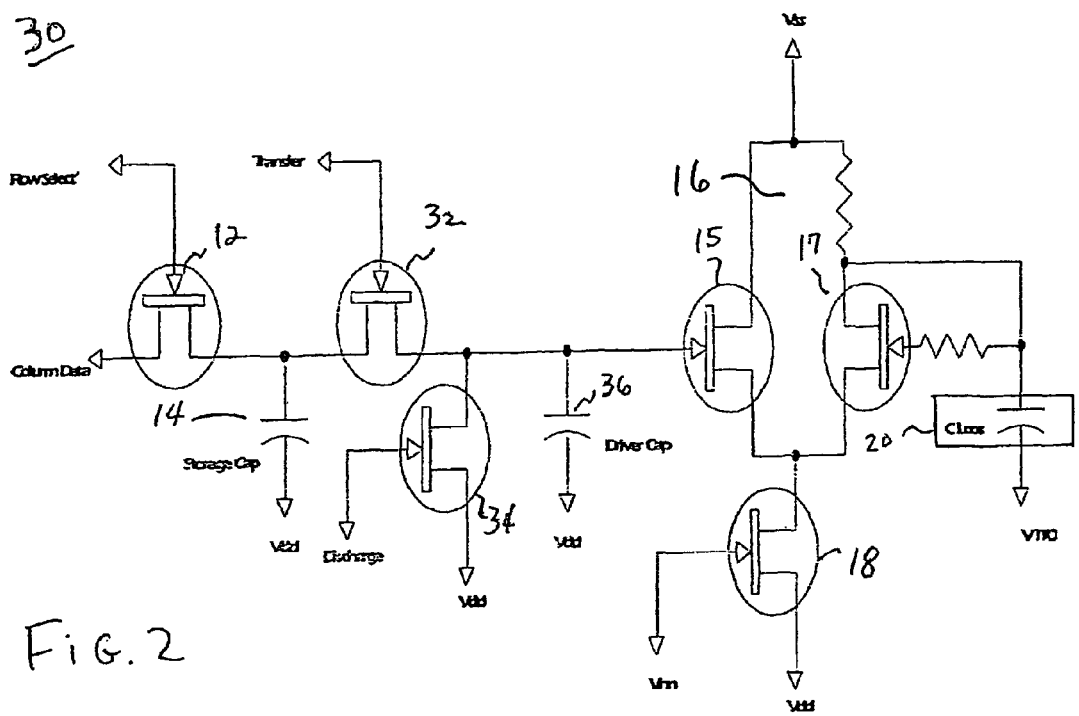
FIG. 2 is a block diagram of another liquid crystal cell driver in accordance with the present invention.

The arrangement of FIG. 2 adds a global switch element (32) to transfer data from the storage element to the driver. This allows for increased pixel drive for the same circuit operating voltages, and reduces image retention and flicker by allowing for inversion of the pixel drive voltage and the ITO transparent conductive electrode from frame to frame.

Referring to FIG. 2, another liquid crystal cell driver 30 is shown similar to the liquid crystal cell driver 10 of FIG. 1. In addition to the elements previously recited with respect to cell driver 10, cell driver 30 further comprises the global switch element 32 in the form of a transistor coupled between the storage capacitor 14 and the differential amplifier 16. The global switch element transfers data from the memory cell (14) to a driver capacitor 36 of the display driver.

The problem of flicker has been addressed by many mechanisms in the past. The issue of drive voltage and image retention has been addressed in digital drive LCOS displays.

The main benefit of the technique disclosed herein is to separate the liquid crystal cell (20) from the storage capacitor. This separation as shown in FIG. 2 allows for updating all the cells of the entire LC array at one time if desired. The benefit of this is two-fold. First, this separation (with further preprocessing to determine which LC cells have changed from frame to frame) also allows for updating of only the cells in the LC array that have changed from a prior frame. In other words, the contents of the storage capacitor 14 can be changed without instantaneously changing the display content on the LC cells. This greatly reduces the data rate needed for static pictures. It also allows for the possibility of driving the display in an interlaced mode without displaying interline scanning artifacts. In a system which is interlaced, normally odd lines are written on a first scan, and even lines are written on a second scan. This scanning scheme produces the artifact known as 'interline flicker'. This even happens for data which is not intrinsically interlaced, such as film. The reason for "interline flicker" is that the even lines from one frame are displayed at the same time that the odd lines from the previous frame are displayed. Any portion of the frame which changed will show an interline flicker. With the present invention, a display having an array of storage capacitors (14) corresponding to an array of LC cells would be updated just as normal (even lines followed by odd lines), except that the entire LC array would then be updated once the storage array has been filled. Thus, lines from different fames are never displayed simultaneously.

The second benefit of this technique is that it allows the common electrode voltage to be modulated from frame to frame. This modulation increases the effective electric field which can be applied to the LC for a given operating voltage of the driver circuit. This is a significant advantage, as finer process geometry will reduce the maximum allowed driving voltage.

The technique can most simply be implemented with the circuit described in FIG. 1, with a modification as shown in FIG. 2. The voltage Vnn of FIG. 2 is a static voltage which controls the current source for the transistors 15 and 17. The Row and Column address are normal addressing for an active matrix display. The control signals (Transfer and Discharge) are separate globally controlled signals which transfer the charge on the storage capacitor 14 to the drive capacitor 36, which drives the LC cell. The additional transistor 34 and capacitor 36 on the device are added to implement the new circuit and operationally allows for the adequate discharge of current from the storage capacitor 14 after each transfer. The additional components should not be significant as process fabrication technology moves forward towards 0.1 microns and below.

Figure 3:
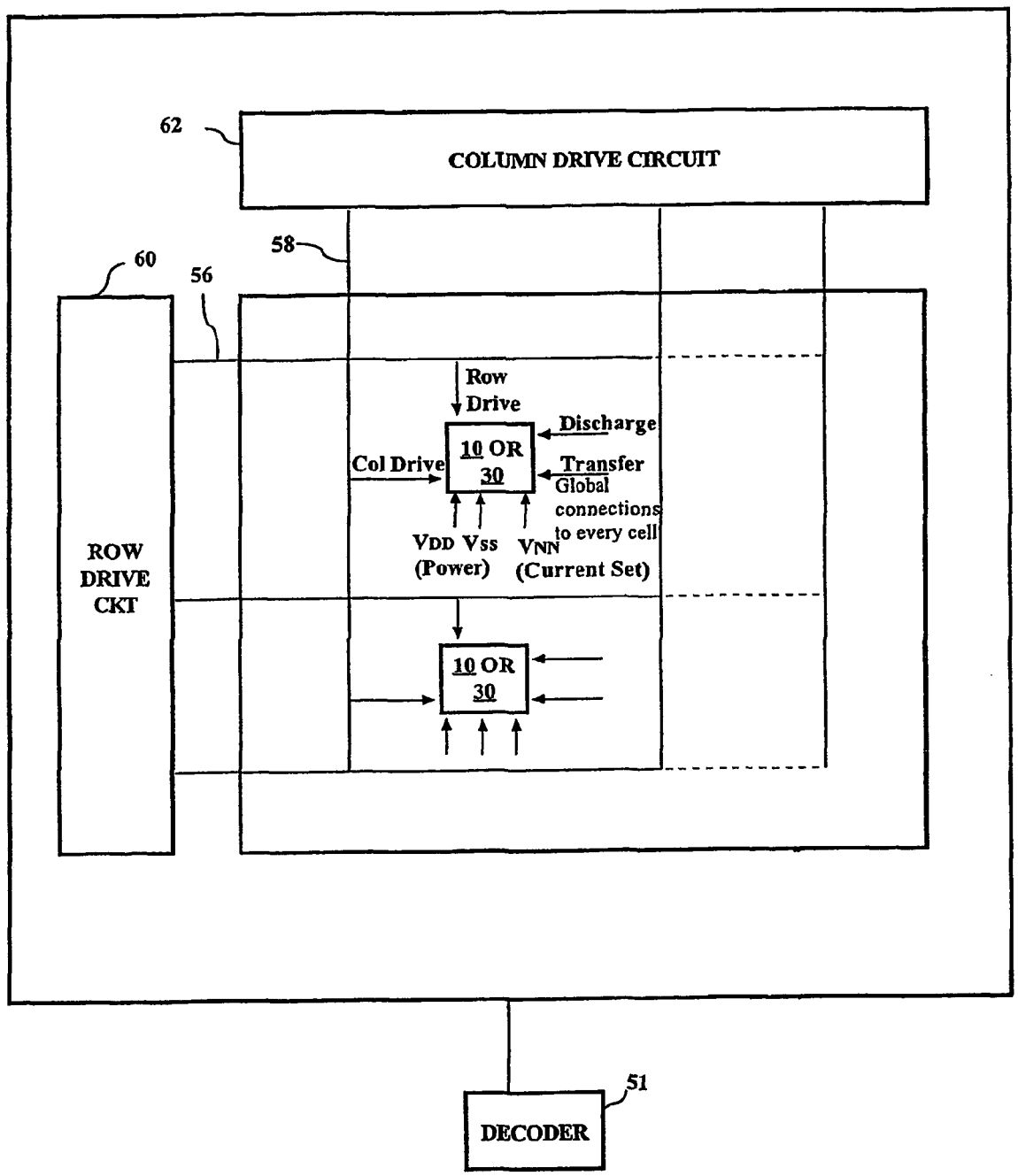
FIG. 3 is a block diagram of a display unit utilizing a liquid crystal cell driver in accordance with the present invention.

Referring to FIG. 3, a display unit 50 is shown that can utilize the display drivers 10 or 30 as previously described above. The display unit 50 preferably includes a plurality of display elements arranged in a matrix of rows and columns and a memory element and a liquid crystal cell. The driver for each display element preferably switchably outputs one of a plurality of voltages to the display elements on at least one of the matrix of rows and columns, the display unit including a decoder 51 controlled by a conventional decoder 51. The driver (not shown in FIG. 3) can include a storage capacitor and a differential amplifier coupled between the storage capacitor and the liquid crystal cell, whereby the differential amplifier provides isolation between the storage capacitor and the liquid crystal cell. The display unit can include a decoder and a plurality of semiconductor switches such as shown in FIG. 1 or 2 controlled to be opened or closed by an output signal of the decoder 51. As shown in FIG. 3, the display unit 50 can include a row drive circuit having a plurality of row (scanning) address lines 56 and a column drive circuit 62 having a plurality of column (data) address lines 58.

Referring to FIG. 4, a flow chart is shown illustrating a method 200 of driving a display in accordance with the present invention. The method 200 preferably comprises the step 202 of providing isolation between a storage capacitor and a liquid crystal cell using a differential amplifier, the step 204 of ensuring rapid desired voltage levels on a pixel using additional current provided by the differential amplifier, and the step 206 of continuously refreshing the voltage on the liquid crystal cell. The method 200 may further comprise the step 208 of maintaining low leakage current from the storage capacitor and the step 210 of gating a current source provided to the differential amplifier. Additionally, the method 200 may further comprise the step 212 of applying a closed loop correction voltage to the liquid crystal cell. As applicable to display driver 30 of FIG. 2, the method 200 could comprise the step 214 of reducing image retention and flicker using a global switch element which is coupled between the storage capacitor and the differential amplifier and may further comprise the step 216 of updating an entire array of liquid crystal elements simultaneously. The method may also include the step 218 of updating only a memory cell that has changed from a previous frame. Additional benefits of the method 200 may include the step 220 of driving a memory array in an interlaced mode without displaying interline scanning artifacts and/or the step 222 of modulating a common electrode voltage from frame to frame to reduce a required liquid crystal drive voltage.

Although the present invention has been described in conjunction with the embodiments disclosed herein, it should be understood that the foregoing description is intended to illustrate and not limit the scope of the invention as defined by the claims.

What is claimed is:

1. A drive circuit for charging a liquid crystal cell of a display device in accordance with input data comprising:
    a first switch including a first switch input for receiving said input data and a select input of said first switch for switching said input data from said first switch input to a first switch output in response to a select signal,
    a storage capacitance coupled to said first switch output;
    an amplifier coupled between said storage capacitance and said cell;
    a second switch coupled to said first switch output and to said amplifier, and
    a third switch coupled through said second switch across said storage capacitance, to discharge current from said storage capacitance; and
    means for gating said amplifier in response to said select signal.

2. The drive circuit of claim 1 wherein said cell comprises a plate electrode and a common electrode and wherein said input data includes data positively charged with respect to said common electrode and data negatively charged with respect to said common electrode and wherein said amplifier is coupled to refresh a charge on said plate electrode in accordance with said input data.

3. The drive circuit of claim 1 wherein said amplifier is operable to electrically isolate said cell from said storage capacitance.

4. A drive circuit for charging a liquid crystal cell of a display device in accordance with input data comprising:
    a first switch including a first switch input for receiving said input data and a select input for switching said input data from said first switch input to a first switch output in response to a select signal,
    a storage capacitor coupled to said first switch output;
    an amplifier coupled to said cell;
    a second switch coupled between said storage capacitor and said amplifier to transfer a charge from said storage capacitor to said amplifier; said second switch operable independently of said first switch; and
    a third switch coupled to said amplifier, said third switch coupled through said second switch across said storage capacitor to discharge current from said storage capacitor; and
    means for gating said amplifier in response to said select signal.

5. The drive circuit of claim 4 further comprising a drive capacitor coupled to the output of said second switch.

* * * * *